US006227460B1

(12) United States Patent
Funk et al.

(10) Patent No.: US 6,227,460 B1
(45) Date of Patent: May 8, 2001

(54) SELF-CONTAINED CLEANING SYSTEM

(75) Inventors: Hans G. Funk, Aurora; David L. Shaffer, Mantua, both of OH (US)

(73) Assignee: Sparkle International, Inc., Bedford Heights, OH (US)

(*) Notice: Subject to any disclaimer, the term of this patent is extended or adjusted under 35 U.S.C. 154(b) by 0 days.

(21) Appl. No.: 09/459,296

(22) Filed: Dec. 10, 1999

Related U.S. Application Data

(60) Provisional application No. 60/120,626, filed on Feb. 18, 1999.

(51) Int. Cl.[7] ....................................................... B05B 2/24
(52) U.S. Cl. ............................................................ 239/131
(58) Field of Search .................................. 239/127, 130, 239/131, 135, 172, 307, 308, 332, 304, 310

(56) References Cited

U.S. PATENT DOCUMENTS

| | | | |
|---|---|---|---|
| 3,346,191 | * 10/1967 | Roach | 239/127 |
| 3,380,658 | * 4/1968 | Stasz et al. | 239/127 |
| 3,421,694 | * 1/1969 | Muller | 239/127 |
| 3,481,544 | * 12/1969 | Jackson | 239/127 |
| 3,567,342 | * 3/1971 | Jackson | 239/127 |
| 3,831,849 | * 8/1974 | Studinger | 239/127 |
| 3,873,004 | * 3/1975 | Feild | 239/304 |
| 4,821,958 | 4/1989 | Shaffer | 239/131 |
| 4,850,853 | * 7/1989 | Gruber et al. | 239/127 |
| 5,758,825 | * 6/1998 | Hsu | 239/127 |

* cited by examiner

*Primary Examiner*—David A. Scherbel
*Assistant Examiner*—Jorge Bocanegra
(74) *Attorney, Agent, or Firm*—Pearne & Gordon LLP

(57) ABSTRACT

A mobile pressure cleaning system contained in a mass-produced commercial van-type vehicle and including an engine and a pair of positive displacement pumps constantly driven by the engine to supply high pressure water and chemical additives to a pair of operator stations. A pair of demand type water heaters, a water supply tank, chemical additive tanks and fuel tanks are also mounted in the cargo area of the vehicle. Novel circuitry enables an operator at either station, independently of the other, to discharge cleaning fluid, hot or cold, with any desired chemical additive. The physical arrangement of the engine, pumps, and water heaters affords a high degree of accessibility to the engine and pumps for inspection, maintenance and repair.

13 Claims, 6 Drawing Sheets

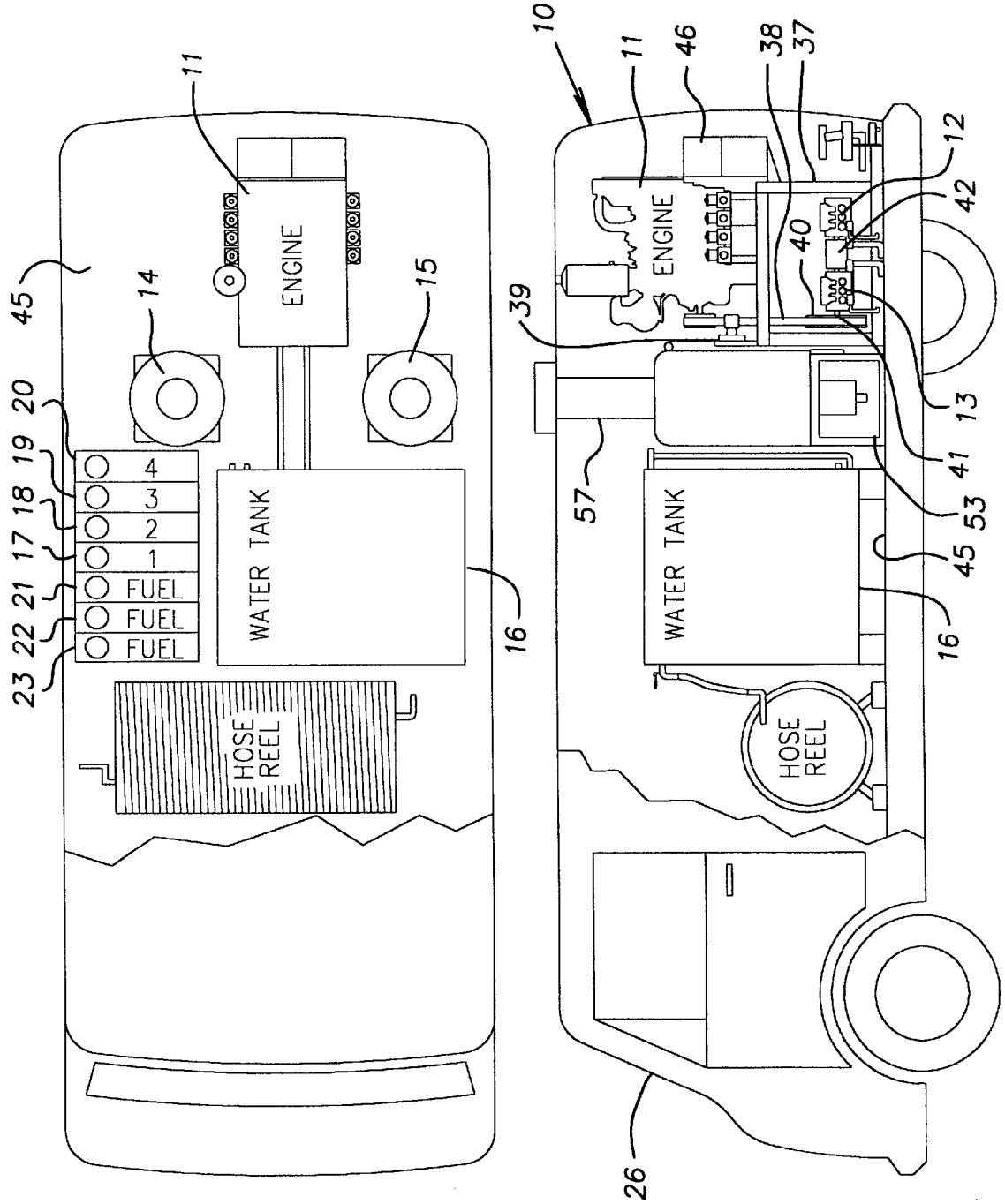

SELF-CONTAINED CLEANING SYSTEM

This application claims the benefit of U.S. Ser. No. 60/120,626, filed Feb. 18, 1999.

BACKGROUND OF THE INVENTION

Mobile pressure cleaning systems are in widespread use because of their effectiveness in cleaning exterior surfaces that are soiled by exposure to airborne dirt, oils, acids and other pollutants as well as by vandalism. Interior surfaces, machinery, commercial road vehicles, boats and the like, can likewise be cleaned to restore their appearance and arrest corrosive and otherwise harmful effects of accumulated dirt, pollution and the like.

A successful arrangement of a known mobile pressure cleaning system is shown, for example, in U.S. Pat. No. 4,821,958, hereby incorporated by reference, assigned to the assignee of the present invention. The patent discloses a pressure cleaning unit mounted within a mass-produced commercial utility van. The unit includes a prime mover, typically a diesel engine, driving a pair of high-pressure pumps. One of the pumps is arranged to supply cold or hot water with or without chemical additives such as acids, alkalines, detergents and waxes. The second pump is arranged to exclusively supply high pressure cold rinse water. Suitable tanks for water, chemical additives, fuel, and a water heater are also included in the vehicle. It has been difficult to package the described hardware into a unit that fits comfortably within a production van with generous water and chemical storage capacity and, at the same time, provide high accessibility to the equipment for maintenance and repair. Conventionally, the high pressure cleaning fluid delivery system enabled one operator to apply various chemicals, but a second operator was restricted to only application of a cold water rinse. Another disadvantage of some previous installations is that they have required two fuel storage systems to accommodate diesel fuel for the engine and kerosene for the water heating. Moreover, earlier water heater arrangements have been arranged horizontally and while affording acceptable performance, are somewhat less efficient and require higher maintenance than vertically arranged heaters.

BRIEF DESCRIPTION OF THE DRAWINGS

FIG. 1 is a schematic side elevational view of a mobile pressure cleaning system embodying the invention;

FIG. 2 is a schematic plan view of the mobile pressure cleaning system;

DESCRIPTION OF THE PREFERRED EMBODIMENTS

Figure 3:
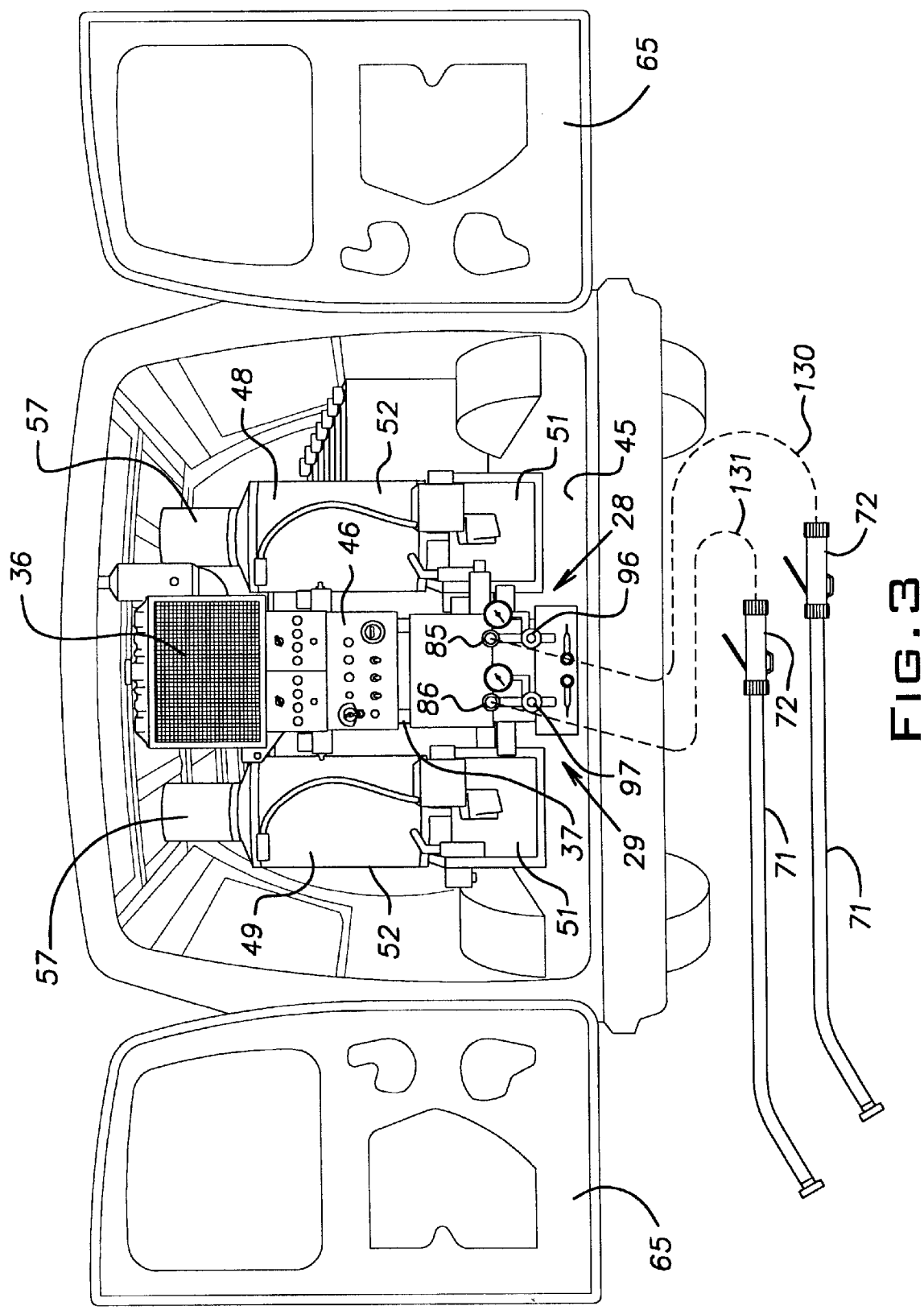
FIG. 3 is a schematic rear elevational view of the mobile pressure cleaning system.

A mobile pressure cleaning system 10 comprises a road vehicle 26 in which is contained an internal combustion engine 11, high pressure pumps 12 and 13 driven by the engine, water heaters 14, 15, a water supply tank or outside water supply 16, chemical additive tanks 17–20, and fuel tanks 21–23. The vehicle is preferably a mass-produced commercial utility van such as a one ton Ford Econoline. As more fully explained hereinbelow, the cleaning system 10 provides two independently operable full-function hose connection stations 28, 29 to give each of two operators complete cleaning capability.

The prime mover or engine 11 is preferably a diesel engine of about 18 horsepower. The engine 11 is water cooled and has a radiator 36 associated with it. As shown, the engine 11 and radiator 36 are mounted on the upper part of a rectangular tubular steel frame 37. Also mounted on the frame 37 below the engine are the pair of high pressure pumps 12, 13 which are of the positive displacement piston or plunger type. The pumps 12, 13 are arranged in tandem so that their shafts are coaxial and parallel with the crankshaft of the engine 11. The engine 11 drives the pumps 12, 13 through a pulley 39 on the crankshaft of the engine 11, a V-belt 38 and a pulley 40 on the shaft 41 of one of the pumps 13. The pump shaft 41 is double-ended such that its opposite end drives the other pump 12 through a coupling 42. A suitable pump for the disclosed application is marketed by Cat Pumps of Minneapolis, Minn. under the Model No. 5CP Plunger Pump. A control panel 46 is also mounted on the frame 37 and contains various switches and electrical devices to produce the desired cleaning functions in a manner generally known from aforementioned U.S. Pat. No. 4,821,958. The frame 37 is removably bolted to a floor board 45 of the truck vehicle 26 so that the engine 11, pumps 12 and 13, and control panel 46 can be installed and removed in and out of the vehicle by handling the frame 37 as a skid.

The pair of demand-type water heaters 14, 15 are installed in the cargo area of the vehicle 26 ahead of the engine 11. The heaters 14, 15 are substantially identical and comprise a lower burner unit 51 and a cylindrical burner shell 52. Both the burner unit 51 and shell 52 are mounted on a steel tube frame 53 which, like the engine frame 37, can be handled like a skid and is bolted to the floor board 45 of the vehicle 26. The burner shell 52 has its longitudinal axis in a vertical orientation and contains a helically coiled tube concentric with the shell axis. Water flowing through the coil 56 (FIG. 4) is heated by combustion in the burner shell 52 of diesel fuel both atomized and supplied with combustion air in a known manner. The burner unit 51 includes a fuel pump and a combustion air blower operated by an electric D.C. motor. The burner unit can be that marketed by R. W. Beckett Corporation of Elyria, Ohio as Model ADC. The pump and blower motor draws electrical power supplied by an alternator on the engine 11. The alternator can be arranged to charge a lead acid storage battery and the burners 51 of the heaters 14, 15 can be operated from the battery and/or the alternator. The combustion products passing through the burner shell 52 go through ducts 57 through the roof of the vehicle 26.

The water tank 16 supplies water to both pumps 12, 13 through suitable circuitry. In the illustrated arrangement, the engine 11 and water heater units 14, 15 each have a dedicated one of a set of three fuel tanks 21–23 all containing diesel fuel. Alternatively, a single larger fuel tank can be used to supply these devices with diesel fuel.

It can be seen from a study of FIGS. 1–3 that the vertically oriented water heater shells 52 are situated forward and lateral of the engine 11 and pumps 12, 13. This arrangement leaves opposite sides of the engine 11 and pumps 12, 13 readily and conveniently accessible for inspection, maintenance and repair from the rear doors designated 65 of the vehicle 26. This arrangement also allows the engine 11 and pumps 12, 13 to be removed out the rear of the vehicle without disturbing the water heater units 14, 15, for example, when major maintenance or repair is required of these parts.

The four chemical additive tanks 17–20 typically store detergent, wax, acid and alkaline liquid solutions. The present invention affords greater versatility in a mobile pressure cleaning system by allowing two operators to work independently of one another with any desired sequential combination of chemical cleaning treatments represented by the solutions in the chemical tanks. As is more fully explained below, each hose connection station 28, 29 has associated with it a spray applicator 71 which includes a hand lever operated valve 72. Each spray applicator 71, whether or not the other spray applicator 71 is being used, can deliver high pressure hot or cold water with or without one of the four chemical additives contained in the tanks 17–20.

Figure 4:
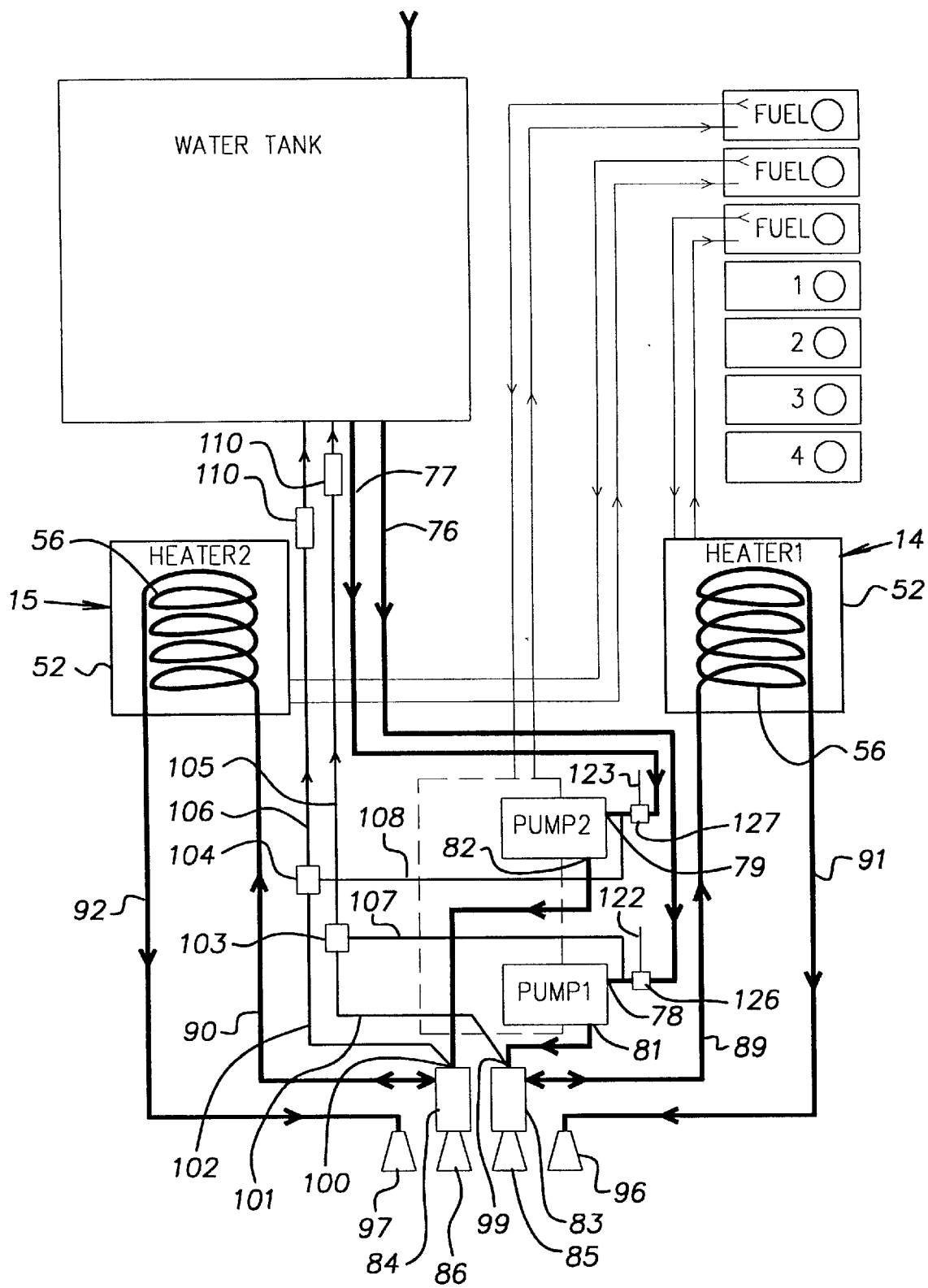
FIG. 4 is a schematic circuit illustrating one embodiment of the water and fuel flow of the cleaning system.

Referring now to FIG. 4, the high pressure pumps 12, 13 receive water from the common on-board supply tank 16 through respective lines 76, 77 at their inlets 78, 79. The pumps 12, 13 are continuously driven whenever the engine 11 is operated. Each pump 12, 13 has an outlet connected by a line 81, 82 to an unloader valve 83, 84. The unloader valves 83, 84 have outlets fitted with quick-connect hose couplers 85, 86, Additional outlets of the unloader valves 83, 84 are connected by lines 89, 90 to respective water heaters 14, 15. Lines 91, 92 convey hot water, generated in the associated heater 14, 15, to quick-connect couplers 96, 97. Unloading ports 99, 100 on the unloader valves 83, 84 are connected through bypass lines 101, 102 to manually operated 3-way valves 103, 104. In one position, a 3-way valve 103, 104 connects its bypass line 101, 102 to the water tank 16 through a line 105, 106 and in the other position to a respective pump inlet 78, 79 through a line 107, 108. Check valves 110 prevent reverse flow in the lines 105–106.

Figure 5:
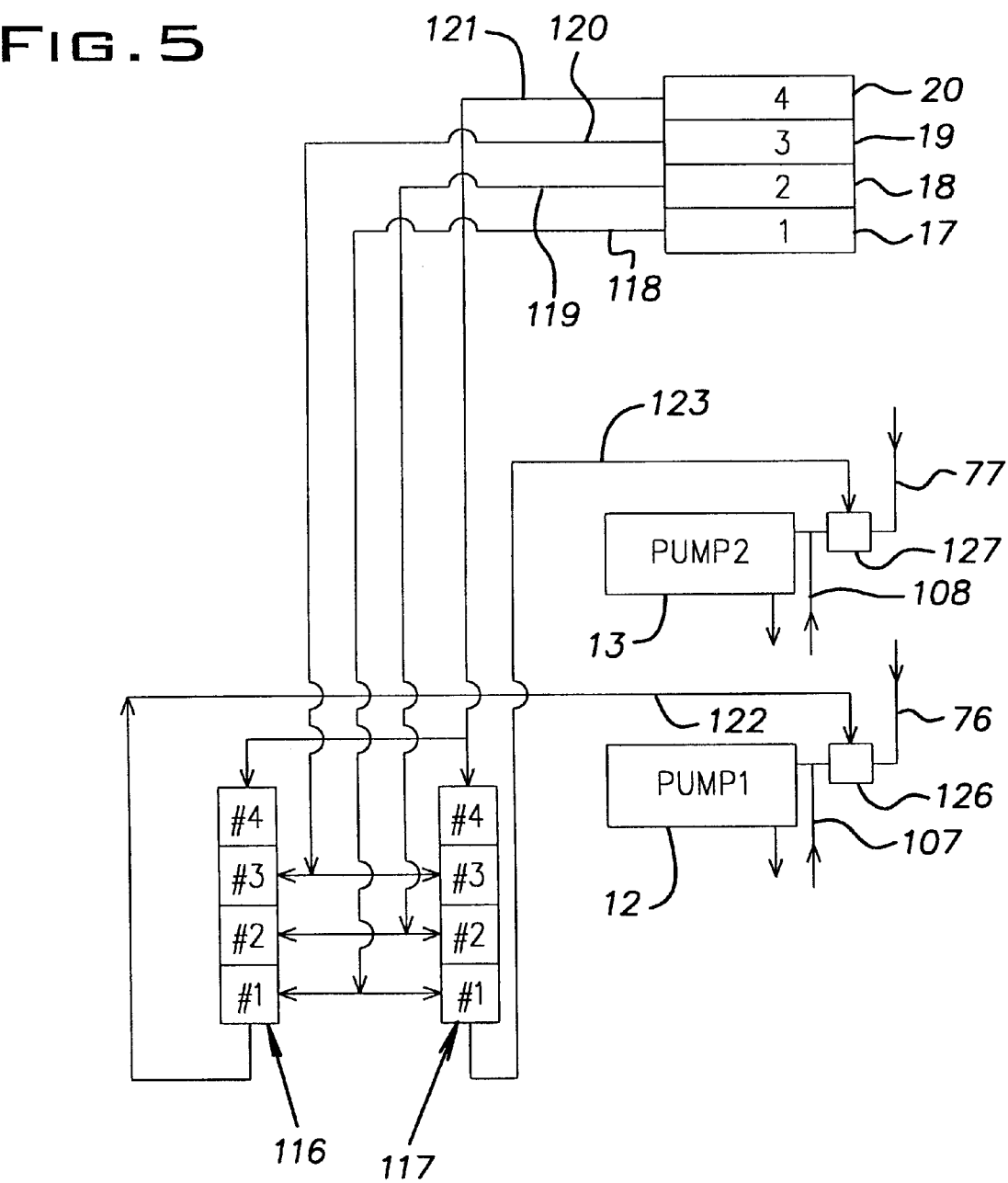
FIG. 5 is a schematic circuit for the chemical additives used with the embodiment of the pressure cleaning system shown in FIG. 4.

With reference to FIG. 5, a bank of solenoid operated flow control valves 116, 117 is associated with each one of the pumps 12, 13. Separate lines 118–121 connect the valves 116, 117 to the chemical additive tanks 17–20. Outlets of the valves of each bank 116, 117 of valves are commonly connected to a line 122, 123 leading to devices such as a venturi injector 126, 127 in series with a line 76, 77 to the pump inlets 78, 79.

In operation of the embodiment of the circuitry illustrated in FIGS. 3, 4 and 5, pressure cleaning is initiated by connecting a hose 130, 131 to which a spray applicator 71, 72 is attached to one of the couplers 85 or 96, 86 or 97 of one of the stations 28, 29 and, if two operators are working, to one of the couplers of the other station. Operation of the water and chemical delivery circuits is the same for each pump 12, 13 of the stations 28, 29. If no hose is coupled to either of the hot or cold outlets of a station 28, 29 or if a hose is coupled to either of the quick-connect couplers but the handle of the valve 72 is not squeezed, the unloader valve 83, 84, in a known manner, unloads the pump by connecting the pump outlet to the 3-way valve 103, 104. If an operator intends to use a particular station 28, 29, he sets the 3-way valve 103, 104 to an "in use" position where the pump outlet is connected to the pump inlet by the line 107, 108 whenever the unloader valve 83, 84 is unloading. If an operator does not intend to use a particular station 28, 29, the respective 3-way valve 103, 104 is set to a "tank" position where the unloading or bypass line 101, 102 from the unloader valve 83, 84 is connected by the line 105, 106 to the storage tank 16. In this mode, the unused but reciprocating pump 12, 13 will not overheat because it, in effect, is using the tank 16 as a radiator, constantly circulating water through itself.

If a hose 130, 131 is coupled to the coupler 85, 86, high pressure cold water, i.e. water at the temperature of water in the tank 16, is delivered to the spray applicator when the handle of the valve 72 is squeezed and the same is sensed by the unloader valve 83, 84. Alternatively, if the hose 130, 131 is coupled to the coupler 96, 97, high pressure hot water is delivered to the spray applicator 71, 72 when the lever of the valve 72 is squeezed. In this case, when the unloader 83, 84 operates, water is pumped through the coils 56 of the heater 14, 15 from the line 89, 90 to the coupler 96, 97. Suitable controls sense this flow or "demand" to excite the heater 14, 15 by atomizing and combusting diesel fuel within the shell 52 to heat the coils 56 and water passing through them. A desired chemical additive from any one of the chemical tanks 17–20 is delivered by the pump 12, 13 to the spray applicator by operation of the respective solenoid control valve in a bank 116, 117. Circuitry for switching a desired one of the control valves in a bank 116, 117 on or off is explained in the aforementioned U.S. Pat. No. 4,821,958. When the trigger of the spray applicator valve 72 is temporarily released and the unloader 83, 84 functions to unload, the 3-way valve serves to prevent any chemicals injected into the pump 12, 13 from being directed to the tank 16 while allowing liquid to circulate through the pump 12, 13.

Figure 6:
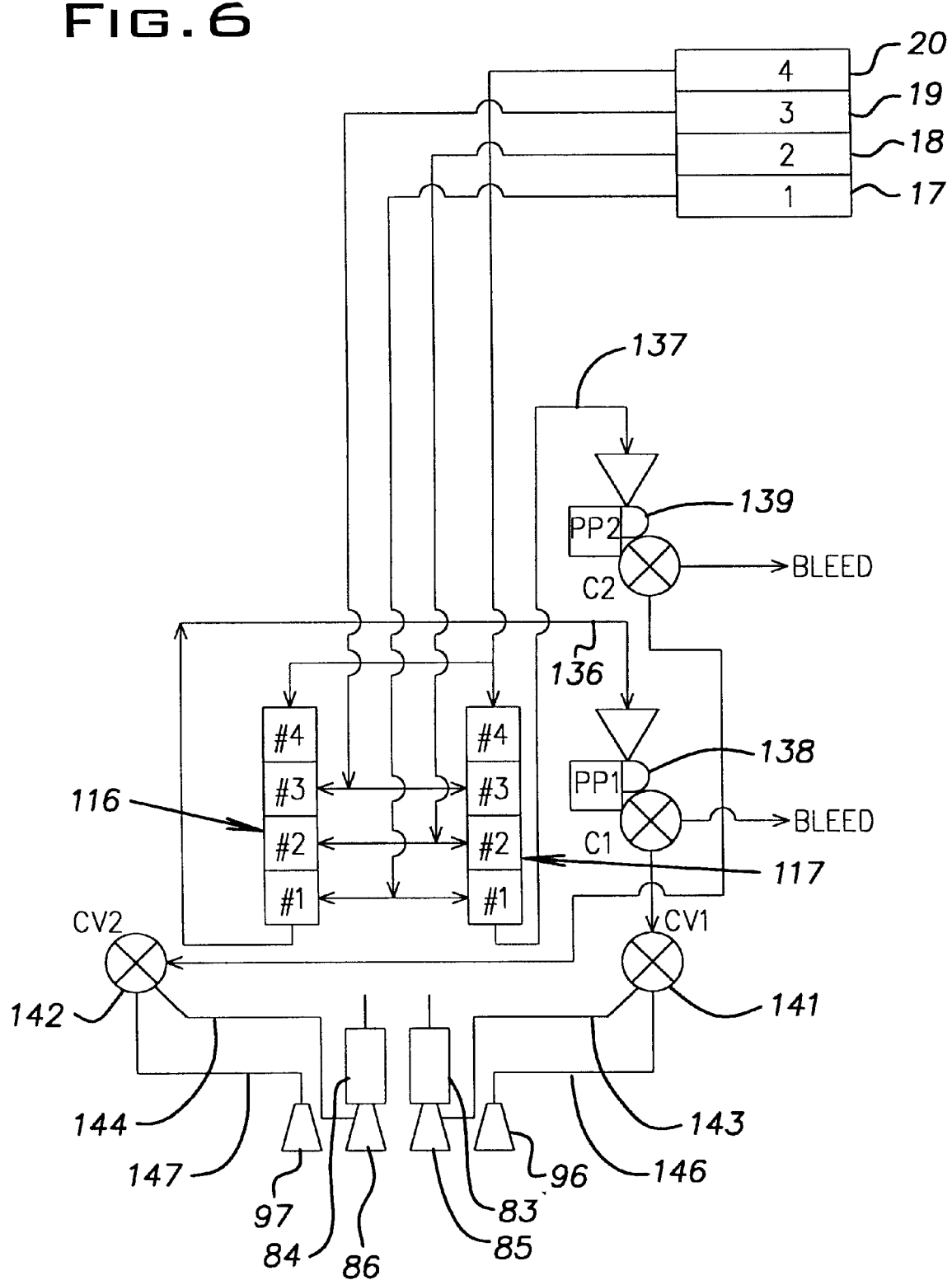
FIG. 6 is a schematic circuit for the chemical additives used in a second embodiment of the invention.
Figure 7:
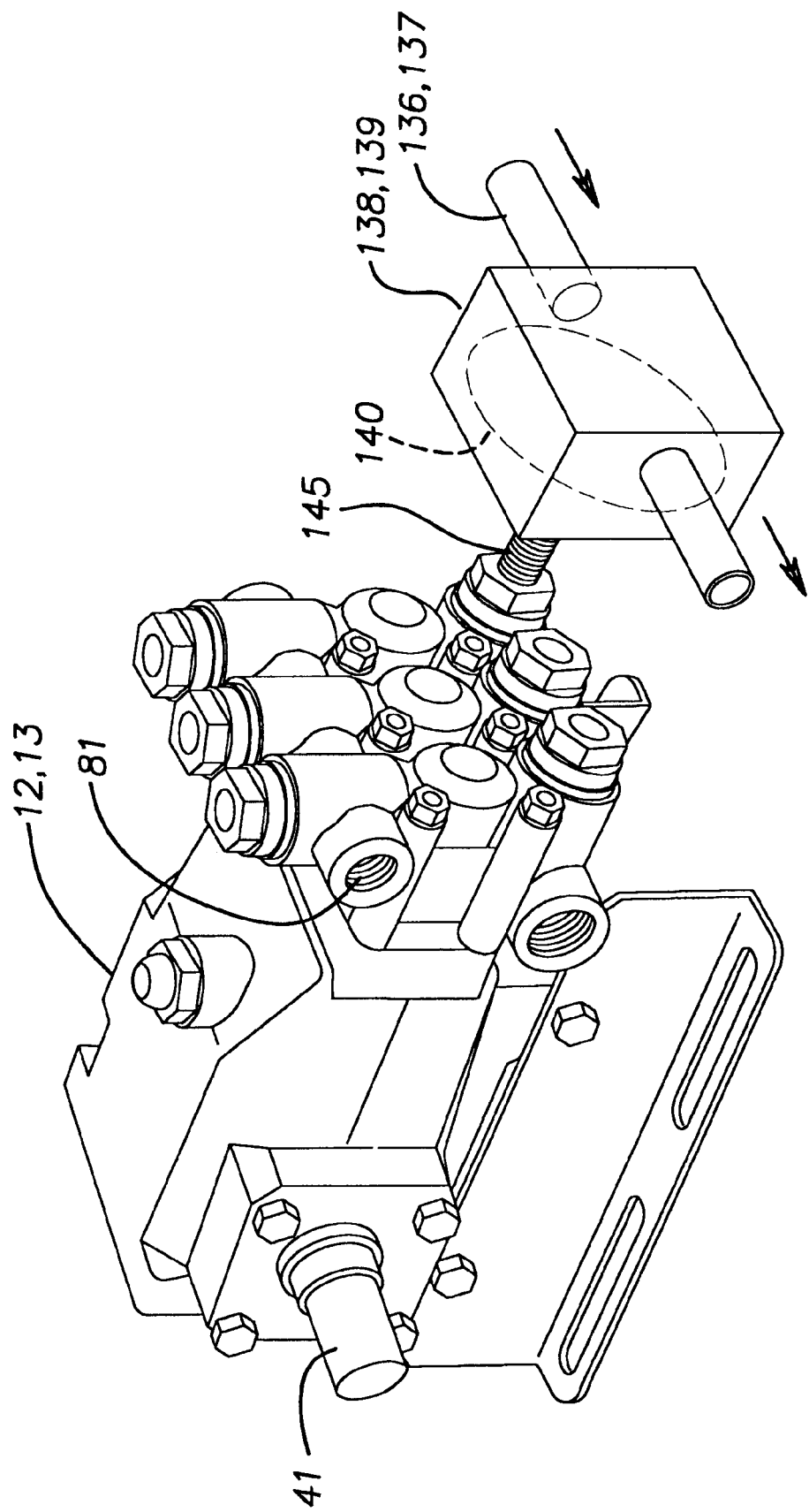
FIG. 7 is a somewhat schematic view of a diaphragm pulse pump for supplying chemical additive in the second embodiment.

FIGS. 5, 6 and 7 diagrammatically illustrate another embodiment of the invention wherein the chemical additives are injected at high pressure into the flow circuitry at the hose couplers 85, 86, 96, 97. Solenoid control valves of the bank 116, 117 for either high pressure pump 12, 13 can be selectively energized to deliver the desired chemical in the manner referenced above. The selected chemical is delivered from the bank of solenoid valves 116, 117 through an associated line 136, 137 to a high pressure pulse pump 138, 139 each associated with one of the high pressure pumps 12, 13 illustrated in FIG. 4. These pulse pumps 138, 139, known in the art, utilize a diaphragm 140 driven by pressure pulses received from the high pressure pump 12, 13 to elevate the pressure of the chemical additive received from the respective line 136, 137 to a level above the pressure of water being delivered by the associated high pressure pump 12, 13 to the respective coupler 85, 86, 96, 97. As shown in FIG. 7, the diaphragm chamber of a pump 138, 139 can be coupled by a line 145 to a valve chamber on the inlet side of a high pressure pump 12, 13 to apply pressure cycles to operate the pump 138, 139. This enables the pulse pump 138, 139 to inject chemical additives into a port on the active coupler. A control valve 141, 142 for each pumping circuit is operated to select a line 143, 144, 146, 147 to the desired coupler 85, 86, 96, 97, either the cold or hot unit for each pumping circuit. The circuit of FIG. 6 replaces the circuit shown in FIG. 5 and works with the system generally shown in FIG. 4 except that the valves 103, 104, lines 107, 108 and injectors 126, 127 are eliminated. In the embodiment of FIGS. 5–7, since chemical additives are injected downstream of the heaters, the heater coil life can be significantly extended. Substitutes for the diaphragm pulse pumps 138, 139 include other known types of pumps driven by fluid power derived from the high pressure pumps 12, 13 or driven by the engine 11 or other sources of power.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. A mobile cleaning unit for use, selectively, by a single operator or by two operators independently of each other, comprising an engine, a pair of pumps constantly driven by the engine, the pumps each having an inlet and an outlet, a water storage supply, a line for supplying water from the water storage supply to each inlet of each pump, a plurality of chemical additive supply tanks, a separate coupler associated with each pump and adapted to connect a hose and spray nozzle, a separate unloader valve connected between the outlet of each pump and the associated one of said couplers, a separate device for delivery of a selected chemical additive to the water pumped by each pump, a separate return line associated with each unloader valve for returning water pumped by each pump to the water storage supply when the associated unloader valve is in an unloading mode, and a separate control valve associated with each return line operable between first and second positions, said control valve in said first position directing water flow from an associated unloader to the water storage supply and in said second position directing water from the associated unloader to the inlet of the associated pump.

2. A mobile cleaning unit as set forth in claim 1, wherein said chemical additive devices each comprise a venturi injector in series with a line from the water storage to the inlet of the associated pump.

3. A mobile cleaning unit as set forth in claim 2, including a line from each of said control valves to a point communicating with the inlet of the associated pump downstream of the related venturi injector.

4. A mobile cleaning unit as set forth in claim 1, including a separate water heater arranged to heat water being pumped by each pump.

5. A mobile cleaning unit as set forth in claim 4, wherein said water heaters are demand-type units.

6. A mobile cleaning unit for use, selectively, by a single operator or by two operators independently of each other, comprising an engine, a pair of pumps constantly driven by the engine, the pumps each having an inlet and an outlet, a water storage supply, a line for supplying water from the water supply to each inlet of each pump, a plurality of chemical additive supply tanks, a separate coupler associated with each pump and adapted to connect a hose and spray nozzle, a separate unloader valve connected between the outlet of each pump and the associated one of said couplers, a separate device for delivery of a selected chemical additive to the water Pumped by each pump, wherein each separate device for delivering selected chemical additive includes an auxiliary pump arranged to deliver chemical additive into a circuit between the outlet of the associated positive displacement pump and the associated coupler, and a separate return line associated with each unloader for returning water pumped by each pump to the storage when the associated unloader is in an unloading mode.

7. A mobile cleaning unit as set forth in claim 6, wherein said auxiliary pumps are arranged to be driven by fluid power derived from their associated positive displacement pumps.

8. A mobile cleaning unit as set forth in claim 1, wherein said pair of pumps are piston pumps having inlet valves and valve chambers enclosing said inlet valves, a separate auxiliary pump associated with each piston pump, a working chamber of each auxiliary pump being operatively connected to a valve chamber of the associated pump to drive the auxiliary pump with pressure pulses occurring in the connection, the auxiliary pump being arranged to receive a selected chemical additive and pump it into a circuit between the outlet of the associated pump and the associated coupler.

9. A mobile cleaning system comprising a van-type truck with a rear cargo space bounded at its lower region by a floorboard, an engine, a pair of high pressure pumps driven by the engine, and a pair of water heaters operatively connected to the pumps in the cargo space, a frame above the pumps to act as a support for the engine, the engine being supported on the frame over the pumps in a manner such that the engine and pumps overlie common areas of the floorboard, the water heaters including a generally cylindrical shell and a coiled tube within the shell, the shell and coil each being arranged in an orientation whereby the engine, pumps and heaters occupy a relatively small portion of the total area of the floorboard.

10. A mobile cleaning system as set forth in claim 9, wherein the engine and pumps are located near a rear door of the vehicle and the water heaters are substantially identical and are arranged in a generally vertical orientation.

11. A mobile cleaning system as set forth in claim 10, wherein the engine and pumps are mounted on a common metal framework that can be handled as a skid for transporting the engine and pumps into and out of the vehicle.

12. A mobile cleaning system as set forth in claim 11, wherein the water heaters are located in the truck forward of the engine and pumps whereby access to the engine and pumps for inspection, maintenance and repair is unencumbered by the water heaters.

13. A mobile cleaning system as set forth in claim 9, wherein the engine and water heater are arranged to be operated with diesel fuel.

* * * * *